US007100349B2

(12) United States Patent
Andrews

(10) Patent No.: US 7,100,349 B2
(45) Date of Patent: Sep. 5, 2006

(54) PROTECTIVE HORSE MASK REMOVABLY ATTACHABLE TO BRIDLE

(76) Inventor: Patricia Andrews, 2123-124 Street, Surrey, BC (CA) V4A 3M4

( * ) Notice: Subject to any disclaimer, the term of this patent is extended or adjusted under 35 U.S.C. 154(b) by 0 days.

(21) Appl. No.: 10/367,911

(22) Filed: Feb. 19, 2003

(65) Prior Publication Data
US 2004/0159083 A1    Aug. 19, 2004

(51) Int. Cl.
  *B68C 5/00*    (2006.01)
  *A01K 13/00*   (2006.01)

(52) U.S. Cl. .................................. 54/80.5; 119/850

(58) Field of Classification Search ........ 54/80.1–80.5, 54/6.1, 6.2; 119/850
See application file for complete search history.

(56) References Cited

U.S. PATENT DOCUMENTS

| | | | | |
|---|---|---|---|---|
| 85,075 A | * | 12/1868 | Dunlap | 119/836 |
| 207,467 A | * | 8/1878 | Whitman | 54/6.2 |
| 287,885 A | * | 11/1883 | Sumner | 54/10 |
| 557,710 A | * | 4/1896 | Smith | 119/836 |
| 3,104,508 A | * | 9/1963 | O'Hare, Jr. | 119/850 |
| 3,753,334 A | * | 8/1973 | Blessing | 54/80.2 |
| 4,404,789 A | * | 9/1983 | Denning | 54/80.2 |
| 4,480,429 A | | 11/1984 | Knox | 54/80 |
| 4,581,877 A | | 4/1986 | Wilber | 54/80 |
| 4,662,156 A | | 5/1987 | Oettel | 54/80 |
| 5,341,627 A | | 8/1994 | Eby | 54/80.2 |
| 5,345,751 A | * | 9/1994 | Edwards | 54/80.2 |
| 5,440,864 A | | 8/1995 | Green | 54/80.5 |
| 6,050,068 A | * | 4/2000 | White, Jr. | 54/80.2 |
| 6,128,891 A | | 10/2000 | McMahon | 54/80.1 |
| 6,216,642 B1 | * | 4/2001 | Hung | 119/850 |
| 2002/0108586 A1 | | 8/2002 | Martin | 119/850 |

FOREIGN PATENT DOCUMENTS

CA    11770130    7/1984

* cited by examiner

*Primary Examiner*—Stephen M. Johnson
*Assistant Examiner*—Bret Hayes
(74) *Attorney, Agent, or Firm*—Oyen Wiggs Green & Mutala LLP

(57) ABSTRACT

A mask to protect a horse from insects is attachable to the horse's bridle. The mask has a cover member, such as flexible plastic screen material, that extends between the brow band, the nose band and the cheek pieces of the horse's bridle. The mask is removably attachable to the bridle, such as by loop and hook fastener. When attached to the bridle, the edges of the mask can be positioned either above or underneath the corresponding part of the bridle. A snug fit between the mask and the corresponding part of the bridle prevents insects from getting under the mask. Two darts space the mask away from horse's eyes. Elastic portions of the mask allow a snug fit between the mask and bridle while the invention is being worn.

22 Claims, 6 Drawing Sheets

PROTECTIVE HORSE MASK REMOVABLY ATTACHABLE TO BRIDLE

FIELD OF THE INVENTION

This invention relates to protective masks for animals. More particularly the invention relates to a mask for horses to protect the horse's eyes and face from insects while the horse is being ridden.

BACKGROUND

Mosquitos, flies and other insects are a common irritation for horses, particularly around their eyes. The presence of insects around a horse's eyes can annoy the horse and can cause infections to develop.

The presence of insects on a horse's eyes and face can distract the horse and cause it to be inattentive to the rider, therefore affecting the safety of both the rider and the horse.

A variety of masks for horses have previously been developed to protect a horse's eyes from flies. Many existing masks are cumbersome and hot for the horse to wear, particularly when the horse is being ridden and wearing a bridle.

U.S. Pat. No. 5,440,864 issued 15 Aug. 1995 to Green discloses an insect control apparatus suitable for horses comprising a piece of material, which the horse can see through, darts to force the shape of the apparatus away from the horse's eyes and a hook and loop fastener (i.e., Velcro®) to affix the apparatus to the horse under the jaw and behind the ears.

U.S. Pat. No. 4,404,789 issued 20 Sep. 1983 to Denning discloses an animal eye protection device suitable for horses comprising a net-like material affixed in a bubble that is spaced from the horse's eyes. The Denning device has an edge lying around the front of the head below the ears and another across the nose. The Denning mask may be attached to the horse by Velcro® straps under the jaw and behind the ears.

U.S. Pat. No. 4,662,156 issued 5 May 1987 to Oettel discloses a protective mask for animals suitable for horses comprising a continuous one-piece screen for covering the eyes and adjacent facial area. The Oettel mask has a single cutout area for the animal's ears, and can be attached to the horse by Velcro® under the jaw.

There exists a need for a protective mask for horses that removably attaches to a bridle, that is not cumbersome and is comfortable for the horse to wear while the horse is being ridden.

SUMMARY OF THE INVENTION

A protective mask for a horse is disclosed comprising a cover member extending from an upper edge below the horse's ears and above the horse's eyes, to a lower edge across the horse's nose, to a first side edge and to a second side edge; and attachment devices for removably attaching the cover member to a bridle. The upper edge can be removably connected to a brow band of a bridle; the first side edge can be removably connected to a first side piece of the bridle; and the second side edge can be removably connected to a second side piece of the bridle. The nose border member can be removably connected to a nose strap of the bridle. The cover member contains a web. The cover member can be molded in a concave manner directing the cover member away from contact with the horse's eyes. Alternatively, the cover member can contain first and second darts directing the cover member away from contact with the horse's eyes. The first dart can extend from the upper edge to a position above the horse's first eye, and the second dart can extend from the upper edge to a second position above the horse's second eye. An alternate arrangement of the darts has the darts extending from the side edges to positions above the horse's eyes.

The upper edge of the cover member may comprise a brow border member; the lower edge of the cover member may comprise a nose border member; the first side edge of the cover member may comprise a first side cheek border member; and the second side edge of the cover member may comprise a second side cheek border member. The brow border member, nose border member, the first and second side cheek border members comprise one or more of the group consisting of cotton, elastic, plastic, polyester, loop and hook fastener and vinyl. At least one of the brow border member, the nose border member, and the first and second side cheek border members may comprise a portion of elastic. The cover member may comprise flexible plastic screen material, an elastomeric mesh, or polyester cord covered with vinyl. The cover member has openings that are sufficiently small to prevent the passage of insects. The attachment devices may be hook and loop fasteners, which may be connected to the cover member at four corners. Attachment devices may also comprise one of the group consisting of buttoning, snapping and tying the cover member to the bridle.

BRIEF DESCRIPTION OF DRAWINGS

In Figures which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
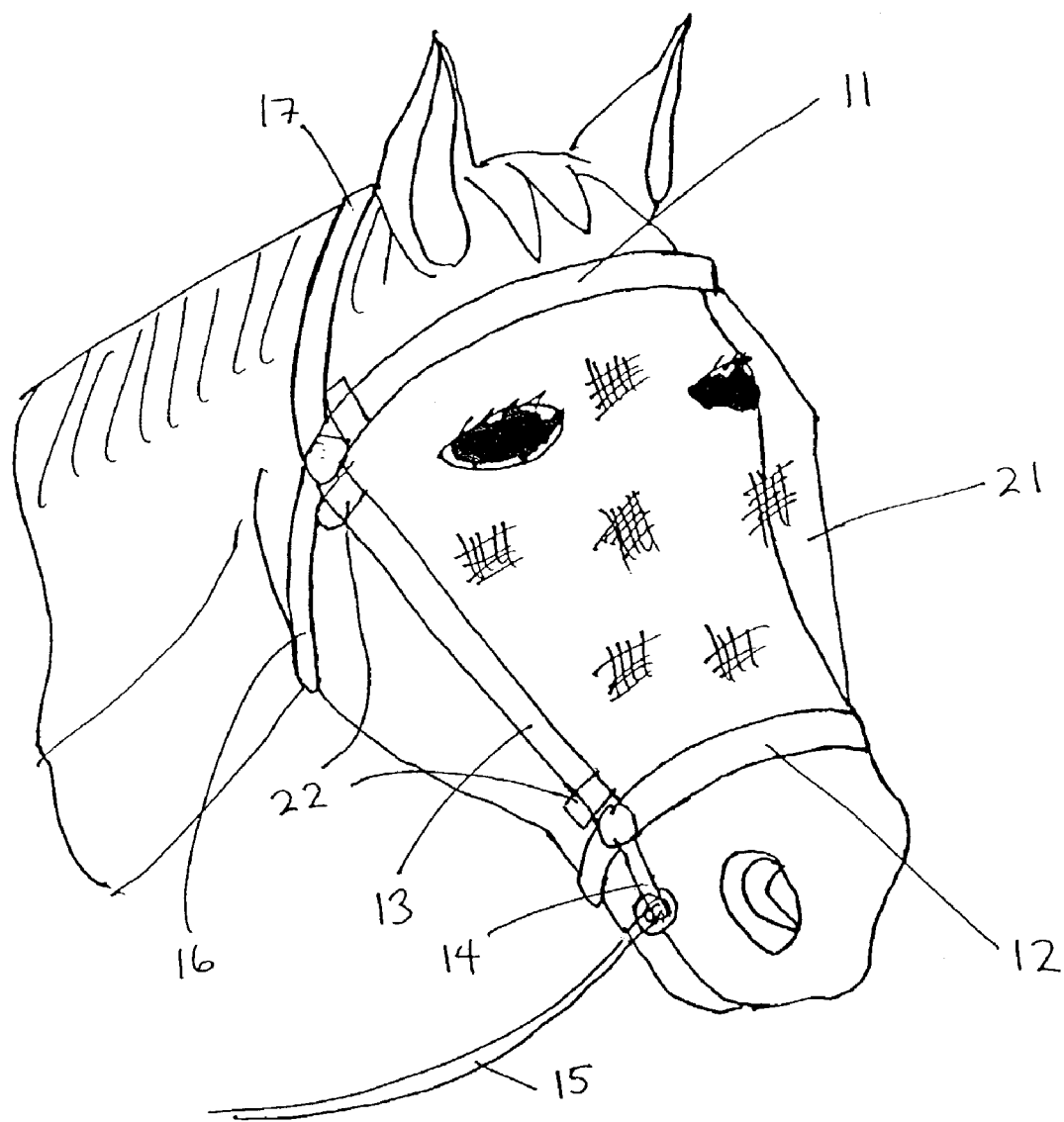
FIG. 1 is a view of the invention secured on a bridle having a nose band.

FIG. 1 is a view of the invention secured on the head of a horse. The horse is shown wearing a bridle, with FIG. 1 showing portions of the bridle, including brow band 11, nose band 12, one of the cheek pieces 13, bit 14, reins 15, throat latch 16 and head stall 17. The invention is comprised of a cover member 21, shown here as a net-like mesh, extending between the brow band 11, the nose band 12 and the cheek pieces 13 of the bridle. The invention is removably attached to the bridle by attachment devices 22, which is preferably a hook and loop fastener and is most preferably Velcro®.

Figure 2:
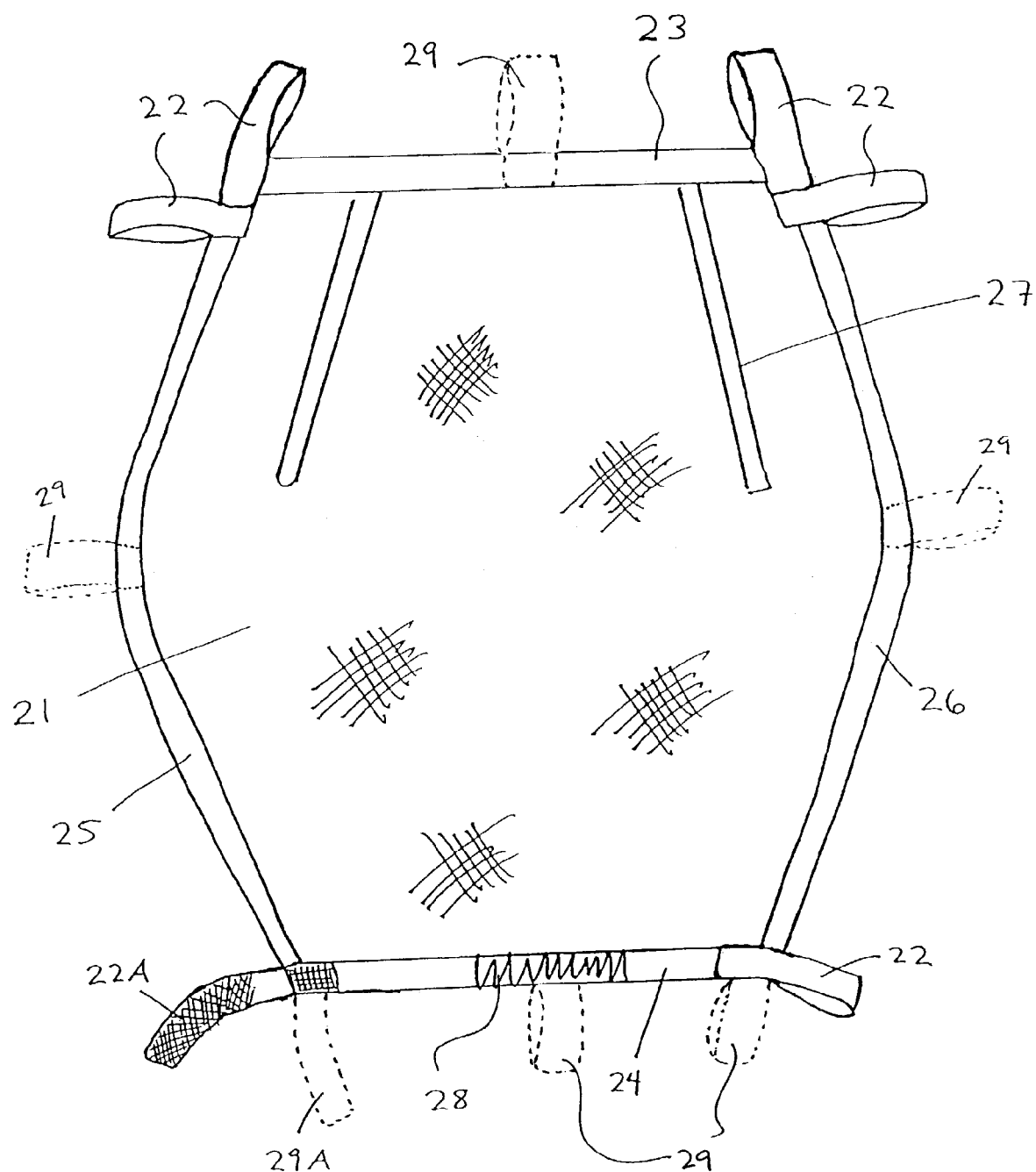
FIG. 2 is a front view of the invention with optional border members.

FIG. 2 is a front view of a preferred embodiment of the invention. As in FIG. 1, the cover member 21 is again illustrated as a net-like mesh. The cover member is preferably comprised of flexible plastic screen material or an elastomeric mesh such as polyester cord covered with vinyl. The cover member may be composed of another transparent material such that the horse may see through the material but insects cannot penetrate. It is preferable that the cover member be composed of a material that would not injure the horse's eyes or face should a tear in the cover member occur.

Figure 6:
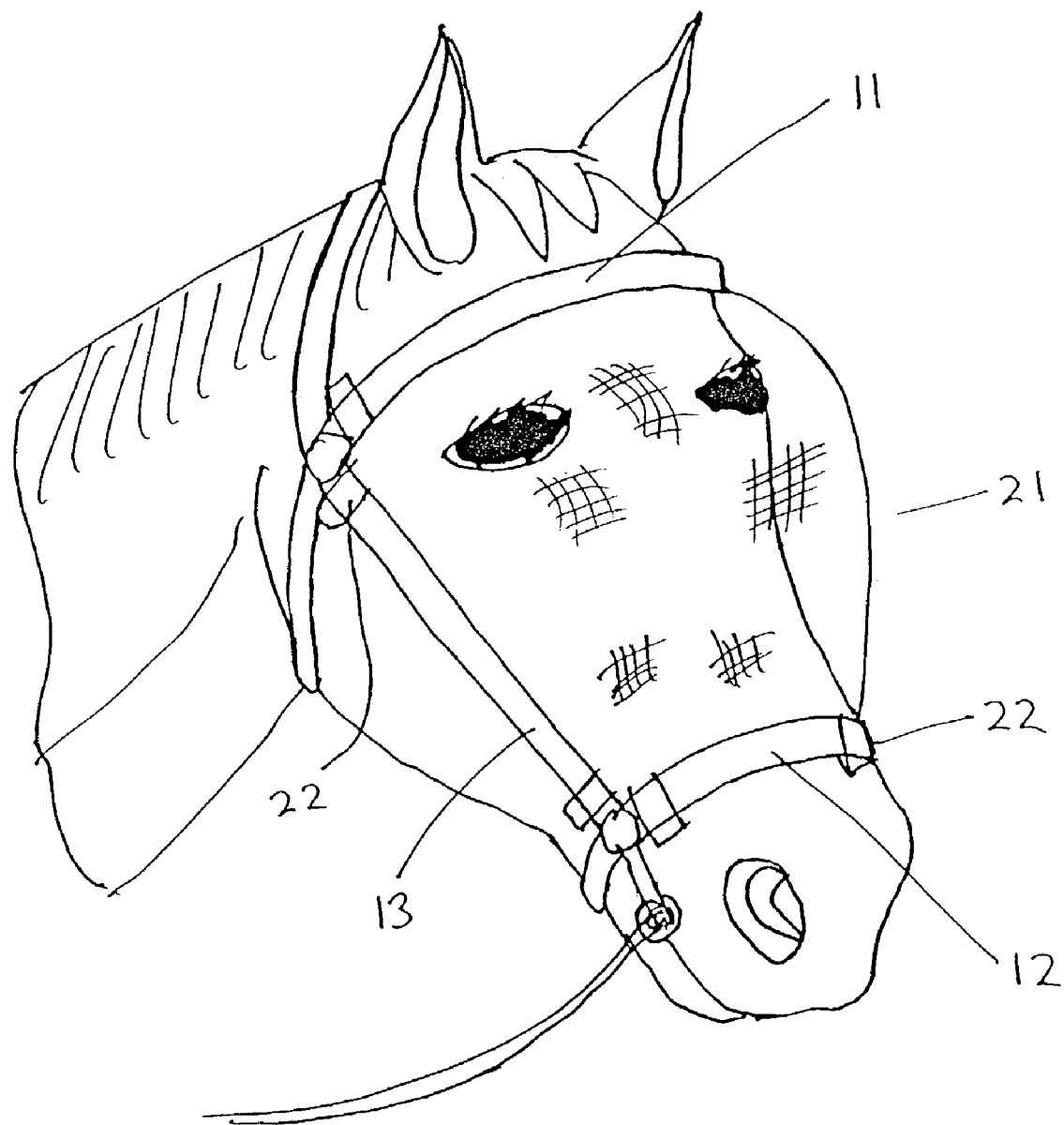
FIG. 6 is a view of the invention with a concave molded cover member secured on a bridle having a nose band.

The attachment devices 22 and 22A and optional attachment devices 29 and 29A are illustrated in FIG. 2 as loops of loop and hook fasteners such as Velcro®. Attachment device 22A and optional attachment device 29A are loop and hook fasteners in open positions whereas all the other attachment devices 22 and optional attachment devices 29 are illustrated in closed positions. While FIG. 2 illustrates a preferred embodiment, it is to be understood that the location of the attachment devices are not to be limited to the placements shown. Other suitable attachment devices can be used, including string or material straps to be tied, buttoned or snapped, such as a dome and cap, to the bridle. Attachment devices are illustrated as near the corners of the invention and near the middle of the side edges, however it is to be understood that the invention may be practiced with attachment devices at any number of places along the mask to secure the invention to the bridle. Variations on the placement of the attachment devices are shown in FIGS. 1, 2 and 6.

FIG. 2 shows a brow border member 23 attached to the upper edge of the cover member 21, a nose border member 24 attached to the lower edge of the cover member 21, a first cheek border member 25 attached to the first side edge of the cover member 21 and a second cheek border member 26 attached to the second side edge of the cover member. When attached to the bridle, each of the border members 23, 24, 25, 26 can be positioned either above or underneath the corresponding part of the bridle, namely the brow band 11, nose band 12, and cheek pieces 13. Accordingly the bridle may be attached over or under the invention. Preferably the cover means 21 is attached securely so that there is a snug fit between each border member and the corresponding part of the bridle such that insects are unable to get under the mask.

Figure 3:
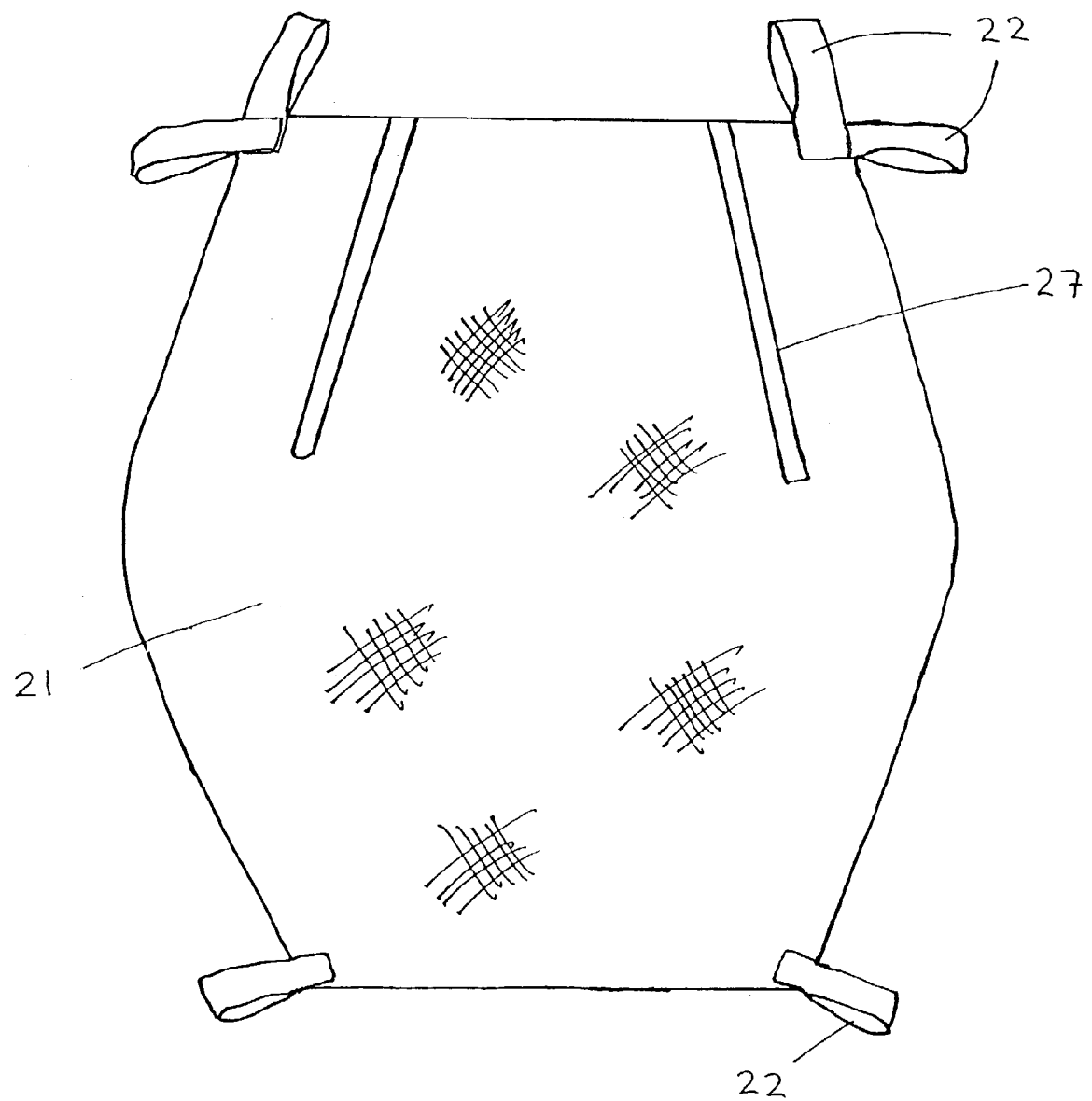
FIG. 3 is a front view of the invention without optional border members.
Figure 4:
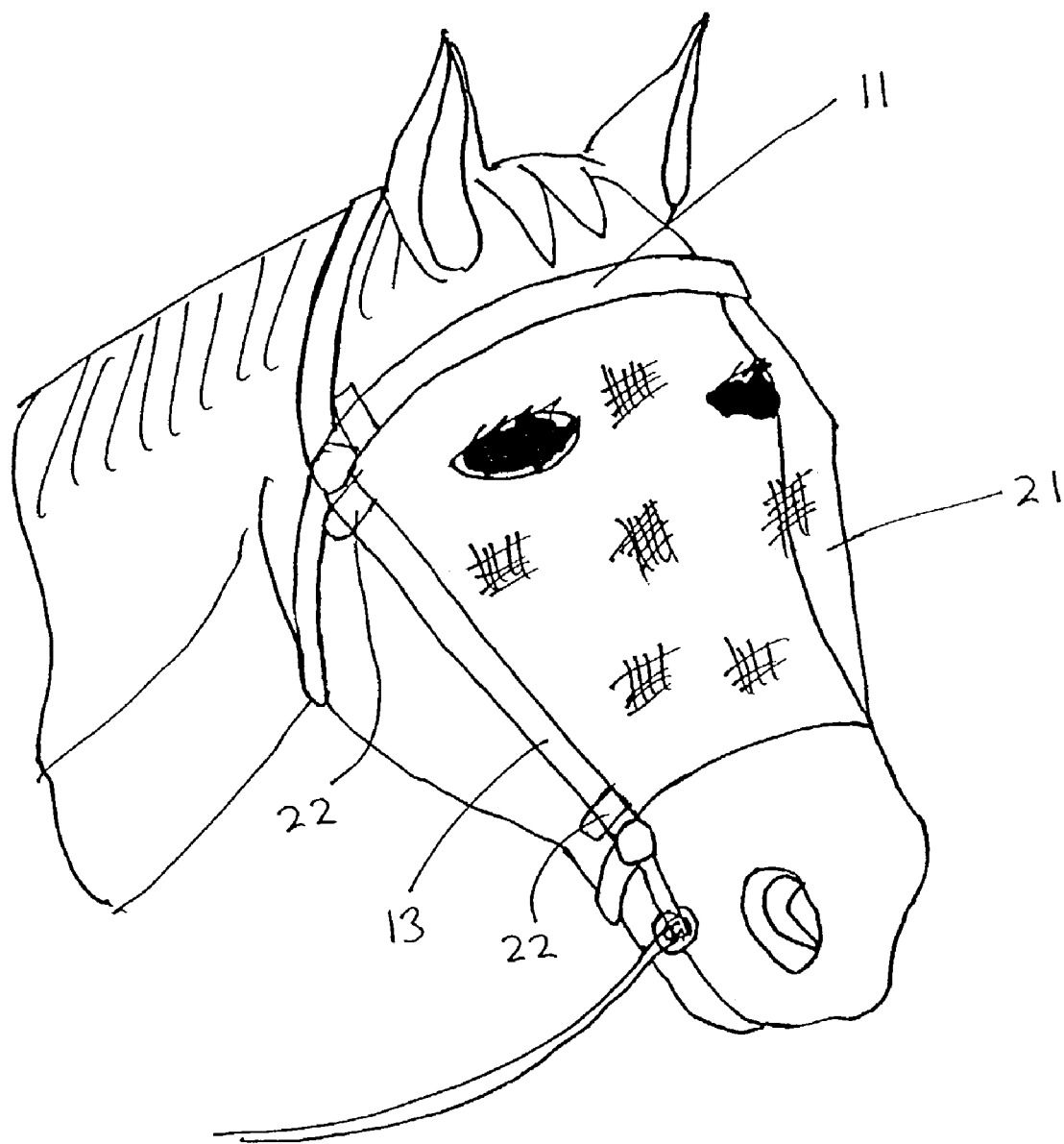
FIG. 4 is a view of the invention secured on a bridle not having a nose band, where the invention does not have a nose border member.
Figure 5:
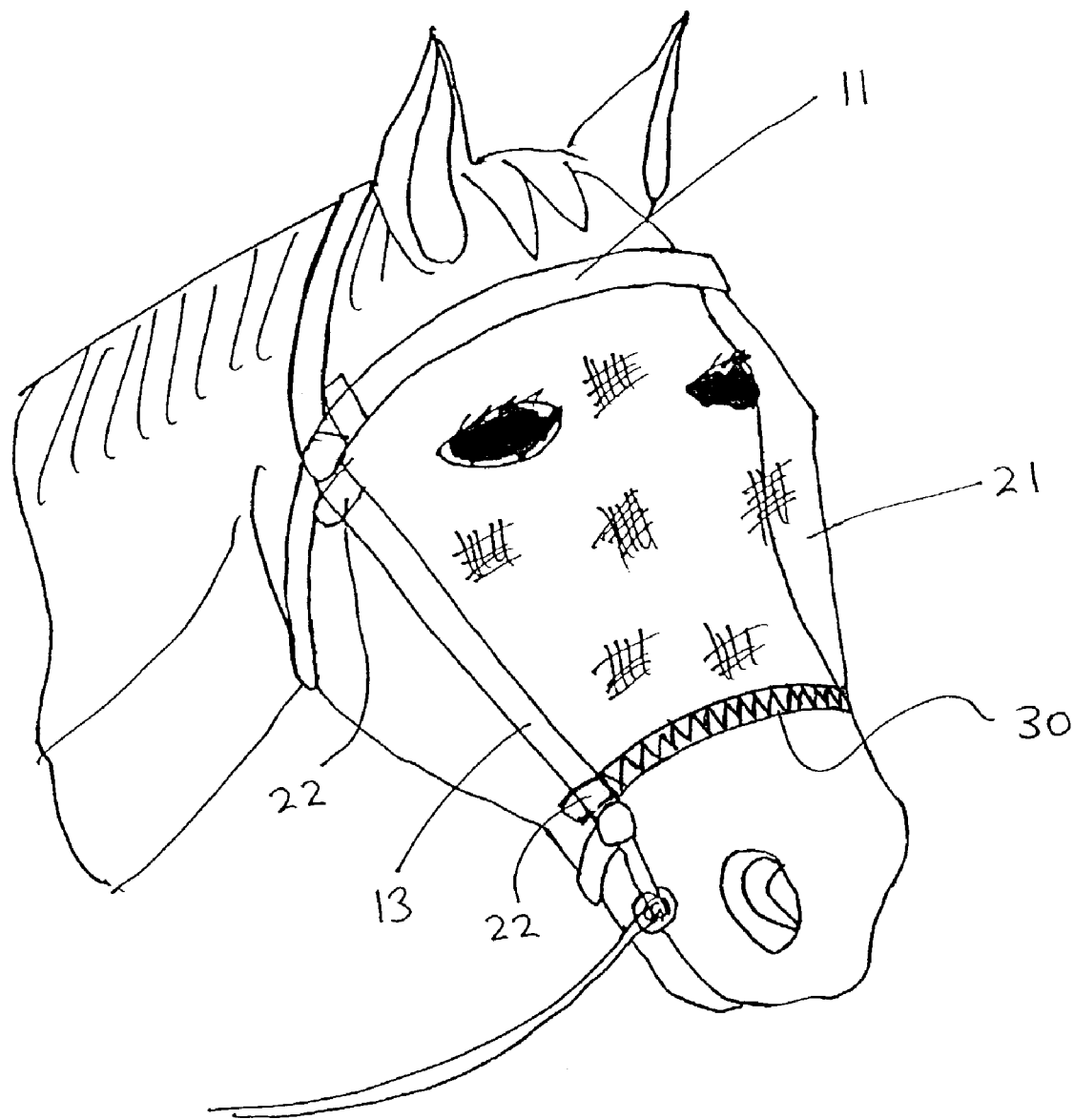
FIG. 5 is a view of the invention secured on a bridle not having a nose band, where the invention has a nose border member comprised of elastic.

The border members are an optional feature of the invention as the invention may be practiced with attachment devices directly attached to the cover member, as illustrated in FIG. 3, by attaching the cover member directly to the bridle. Where border members are not used, the edges of the cover member are snugly attached to the corresponding part of the bridle. Where the bridle does not have a nose band, the lower edge can be directly attached to the horse's nose, as illustrated in FIGS. 4 and 5.

In FIGS. 2 and 3, two darts 27 are shown extending down from the upper edge to position of the cover member to be placed above or near the horse's eyes. The darts 27 shape the invention in a concave manner, spacing the cover member above the horse's eyes. As shown in FIG. 6, the invention can be practiced without the use of darts by molding the cover member into a concave shape to space the cover member above the horse's eyes. The molding can be accomplished for example by heating or ironing the cover member to create a concave bubble-type shape.

In FIG. 2, an optional elastic portion 28 of the nose border member 24 is shown. The elastic portion allows the nose border member to secure a snug fit to the noseband or the horse's nose by stretching and flexing when the horse and bridle move while the invention is being worn. Elastic portions may also be added to the upper and side border members. FIG. 4 illustrates the invention attached to a bridle without a nose band, shown in this illustration without the optional nose border member. Where the bridle does not have a nose band, it is preferably to utilize an optional nose border member comprising elastic 30 as shown in FIG. 5, where nose border member can be held in place by attachment devices connected to the side pieces.

The invention may be removably attached to any type of bridle as will be readily understood by those skilled in the art. The portion of a bridle illustrated in FIG. 1 is a portion of an English bridle, but the invention may also be used on any other suitable bridle such as a western bridle, Hackamore (or bitless) bridle, PVC bridle, dressage bridle, saddleseat bridle, TWH bridle, or a snaffle bridle.

As will be apparent to those skilled in the art in the light of the foregoing disclosure, many alterations and modifications are possible in the practice of the invention without departing from the spirit or scope thereof. For example, FIG. 2 shows the darts extending from the upper edge to positions over the horse's eyes but the invention can equally be practiced with darts extending from the side edges to positions over the horse's eyes. It is also to be understood that different sizes are to be used for different sized horses. For example, versions of decreasing size may be used for warmbloods, horses, Arabian horses and ponies respectively. It is also to be understood that different shaped edges and border members may be used with different bridles. Accordingly, the scope of the invention is to be construed in accordance with the substance defined by the following claims.

What is claimed is:

1. A protective mask apparatus for removable attachment to a bridle of a horse, said bridle having a brow band, first and second side pieces and a nose band, the protective mask apparatus comprising:
   a cover member having an upper edge, a lower edge, a first side edge and a second side edge, the cover member being substantially transparent;
   attachment means for removably attaching the cover member to the bridle;
   the upper edge being removably connectable to the brow band of the bridle;
   the first side edge being removably connectable to the first side piece of the bridle;
   the second side edge being removably connectable to the second side piece of the bridle; and
   the lower edge being removably positionable in contact with the nose band of the bridle.

2. The protective mask apparatus of claim 1, wherein the lower edge is removably connectable to the nose band of the bridle.

3. The protective mask apparatus of claim 1, wherein
   the upper edge is removably connectable to the brow band of the bridle in a snug fit to prevent insects from passing between the upper edge and the brow band;
   the first side is removably connectable to the first side piece of the bridle in a snug fit to prevent insects from passing between the first side edge and the first side piece;
   the second side edge is removably connectable to the second side piece of the bridle in a snug fit to prevent insects from passing between the second side edge and the second side piece; and the lower edge is removably positionable in contact with the nose band of the bridle in a snug fir to prevent insects from passing between the lower edge and the nose band.

4. The protective mask apparatus of claim 1, wherein the cover member contains a web.

5. The protective mask apparatus of claim 4, wherein the cover member is shaped in a concave manner directing the cover member away from contact with the horse's eyes.

6. The protective mask apparatus of claim 4, wherein the cover member contains first and second darts directing the cover member away from contact with the horse's eyes.

7. The protective mask apparatus of claim 6, wherein the first dart extends from the first side edge to a position above the home's first eye, and the second dart extends from the second side edge to a second position above the home's second eye.

8. The protective mask apparatus of claim 4, wherein the cover member contains a first daft extending from the upper edge to a position above a first eye of the horse for directing the cover member away from contact with the horse's first eye, and a second dart extending from the upper edge to a second position above a second eye of the horse for directing the cover member away from contact with the horse's second eye.

9. The protective mask apparatus of claim 4, wherein
the upper edge of the cover member contains a brow border member;
the lower edge of the cover member contains a nose border member;
the first side edge of the cover member contains a first side cheek border member; and
the second side edge of the cover member contains a second side cheek border member.

10. The protective mask apparatus of claim 9, wherein the brow border member, nose border member, the first side cheek border member and the second side cheek border member contain one or more of the group consisting of cotton. elastic, plastic, polyester, hook and loop fastener and vinyl.

11. The protective mask apparatus of claim 1, wherein the upper edge is substantially straight, the first side edge is substantially straight and adjoins the upper edge in a substantially perpendicular arrangement, the second side edge is substantially straight and adjoins the upper edge in a substantially perpendicular arrangement, and the lower edge is substantially straight and adjoins the first side edge and the second side edge in a substantially perpendicular arrangement.

12. A protective mask apparatus for removable attachment to a bridle of a horse, said bridle having a brow band, first and second side pieces and a nose band, the protective mask apparatus comprising:
a cover member having an upper edge, a lower edge, a first side edge and a second side edge, the cover member comprising a web;
attachment means for removably attaching the cover member to the bridle;
the upper edge being removably connectable to the brow band of the bridle, the upper edge containing a brow border member;
the first side edge being removably connectable to the first side piece of the bridle, the first side edge containing a first side cheek border member;
the second side edge being removably connectable to the second side piece of the bridle, the second side edge containing a second side cheek border member; and
the lower edge being removably positionable in contact with the nose band of the bridle, the lower edge containing a nose border member
wherein at least one of the group consisting of the brow border member, the nose border member, and the first and second side cheek border members contain a portion of elastic.

13. The protective mask apparatus of claim 12, wherein a portion of the nose border member is elastic.

14. The protective mask apparatus of claim 12, wherein the cover member consists essentially of flexible plastic screen material.

15. The protective mask apparatus of claim 12, wherein the cover member contains an elastomeric mesh.

16. The protective mask apparatus of claim 15, wherein the elastomeric mesh has openings sufficiently small to prevent the passage of insects.

17. The protective mask apparatus of claim 16, wherein the attachment means comprise hook and loop fasteners.

18. The protective mask apparatus of claim 16, wherein the attachment means comprise hook and loop fasteners connected to the cover member near four corners.

19. The protective mask apparatus of claim 16, wherein the attachment means re comprise connected to the cover member at the first side edge and at the second side edge.

20. The protective mask apparatus of claim 16, wherein the attachment means are comprise characterized by one of the group consisting of buttoning, snapping, buckling and tying the cover member to the bridle.

21. The protective mask apparatus of claim 12, wherein the cover member contains polyester cord covered wit vinyl.

22. A protective mask apparatus for removable attachment to a riding bridle of a home, said bridle having a brow band, first and second side pieces and a nose band, the protective mask apparatus comprising:
a transparent cover member having a four sided perimeter comprising a substantially straight upper edge, a substantially straight first side edge adjoining the upper edge in a substantially perpendicular arrangement, a substantially straight second side edge adjoining the upper edge in a substantially perpendicular arrangement, a substantially straight lower edge adjoining the first side edge and the second side edge in a substantially perpendicular arrangement;
upper attachment means coupled to the upper edge for removably attaching to the brow band of the bridle;
first side attachment means coupled to the cover member for removably attaching the first side edge to the first side piece of the bridle;
second side attachment means coupled to the cover member for removably attaching the second side edge to the second side piece of the bridle;
lower attachment means coupled to the lower edge for removably attaching the lower edge to the nose band of the bridle;
the upper, first, second and lower attachment means being coupled to the cover member pear each of the four corners of the four sided perimeter.

* * * * *